US006450858B1

(12) United States Patent
Schmitz

(10) Patent No.: US 6,450,858 B1
(45) Date of Patent: Sep. 17, 2002

(54) BEEHIVE MOVABLE TOP ENTRANCE

(76) Inventor: Edmund P. Schmitz, 3687 Granger Rd., Medina, OH (US) 44256

( * ) Notice: Subject to any disclaimer, the term of this patent is extended or adjusted under 35 U.S.C. 154(b) by 0 days.

(21) Appl. No.: 09/681,199

(22) Filed: Feb. 19, 2001

(51) Int. Cl.[7] ............................................... A01K 47/06
(52) U.S. Cl. .......................................... 449/20; 449/34
(58) Field of Search ............................. 449/16, 20, 21, 449/32, 34

(56) References Cited

U.S. PATENT DOCUMENTS

| | | | | |
|---|---|---|---|---|
| 391,162 A | * | 10/1888 | Kendall | 449/22 |
| 522,772 A | * | 7/1894 | Aikin et al. | 449/37 |
| 1,410,444 A | * | 3/1922 | Aspinwall | 449/21 |
| 2,128,000 A | * | 8/1938 | King | 449/7 |

* cited by examiner

Primary Examiner—Robert P. Swiatek
(74) Attorney, Agent, or Firm—Christopher L. Parmelee; Walker & Vocke LPA

(57) ABSTRACT

A beehive (100) for honey production comprising a movable top entrance (104) positioned above a brood chamber (102). The movable top entrance is operative to releasably mount to the top of the brood chamber. In addition, the movable top entrance is operative to releasably support one or more honey supers (106) on top of the movable top entrance. The movable top entrance includes an outer frame (112) with at least one aperture (116) therethrough. the moveable top entrance further includes a baffle (122) in supporting connection within the outer frame. The baffle includes a cavity (126) adjacent the aperture in the outer frame. The aperture and the cavity have a size and shape which are sufficiently large to enable honeybees to pass through the aperture and the cavity to a location either above or below the baffle. The baffle has a surface area which fills the majority of the space between the outer frame and is operative to generally prevent the queen honeybee from moving to the honey super. The movable top entrance further includes a landing pad (118) which extends in a generally downward direction from beneath the aperture. The beehive may further include a base (110) that includes a slidable tray (120) for cleaning out debris in the bottom of the beehive.

21 Claims, 5 Drawing Sheets

BEEHIVE MOVABLE TOP ENTRANCE

BACKGROUND OF THE INVENTION

1. Technical Field

This invention relates to manmade beehives. Specifically this invention relates to a movable top entrance for a beehive.

2. Background Art

Manmade beehives are well known. FIG. 1 shows an example of a prior art manmade standard beehive 10. The beehive 10 includes a bottom board 12, a brood chamber 14, a queen excluder 16, a honey super 18, an inner cover 20, and a top cover 22. The bottom board 12 includes hive entrance holes 30 which provide a passage for honeybees into and out of the beehive 10. Both the brood chamber 14 and the honey super 18 include a plurality of honeycomb frames 24, 26. The queen honeybee generally resides in the brood chamber 14 and spends the majority of her time laying eggs in the honeycombs of frames 24. Excess honey is generally stored by the worker honeybees in one or more honey supers 18 located above the brood chamber 14.

Although the prior art standard beehive 10 has been in use for over a hundred years, the configuration of the bottom board has a number of drawbacks. For example, as grass, weeds or other vegetation grows adjacent the bottom of the beehive foliage may cover the holes 30 making it more difficult for worker honeybees to enter or leave the beehive. During the winter months snow may accumulate adjacent the holes 30 of the bottom board, which may lead to suffocation of the honeybees in the beehive. In addition, dead honeybees within the beehive 10 may accumulate adjacent the holes 30 of the bottom board which may block the holes from within the hive and lead to suffocation of the honeybees. Consequently there exists a need for a new configuration of a beehive which is operative to reduce the opportunity for entrance holes to the beehive to become covered or blocked by vegetation, snow, and the accumulation of dead bees and other debris within the beehive.

In addition, honeybees in prior art beehives are susceptible to being eaten by small animals. For example, animals such as skunks may wait adjacent the bottom board 12 of the beehive and feed on honeybees as they leave the beehive. Consequently there exists a further need for a configuration of a beehive which is operative to reduce the opportunity for predator animals to eat honeybees adjacent a beehive.

In prior art beehives, the queen excluder 16 includes a wire grid which enables worker honeybees but prevents the queen bee from moving between the brood chamber 14 and the honey supers 18. This feature keeps the queen honeybee in the brood chamber 14 and prevents her from laying eggs in the honey supers 18. Unfortunately the wires of the queen excluder 16 can injure worker honeybees as they pass therebetween. As a result, there exists a need for a beehive configuration which is operative to prevent the queen honeybee from moving between the brood chamber and the honey supers and is operative to minimize injury to worker honeybees.

BRIEF SUMMARY OF THE INVENTION

It is an object of the exemplary form of the present invention to provide a beehive.

It is a further object of the exemplary form of the present invention to provide a beehive which minimizes the blockage of an entrance to the beehive.

It is a further object of the exemplary form of the present invention to provide a beehive which minimizes the blockage of an entrance to the beehive by vegetation growing adjacent the beehive.

It is a further object of the exemplary form of the present invention to provide a beehive which minimizes the blockage of an entrance to the beehive by snow.

It is a further object of the exemplary form of the present invention to provide a beehive which minimizes the blockage of an entrance to the beehive by dead honeybees.

It is a further object of the exemplary form of the present invention to provide a beehive which minimizes the opportunity for animals to eat honeybees leaving or entering the beehive.

It is a further object of the exemplary form of the present invention to provide a beehive which minimizes injuries to worker bees moving between the brood chamber and the honey supers.

Further objects of the present invention will be made apparent in the following Detailed Description of the Invention and the appended claims.

The foregoing objects are accomplished in an exemplary embodiment of the present invention by a beehive that does not include a bottom board and a queen excluder. The exemplary beehive includes a movable top entrance positioned above the brood chamber. For an established hive the exemplary beehive structure may include a movable top entrance between the brood chamber and one or more honey supers. The exemplary embodiment of the movable top entrance includes an outer frame with a size and shape that is operative to mate with the top of a brood chamber and the bottom of a honey super. The exemplary movable top entrance includes a baffle within the interior portion of the outer frame which is operative to prevent the queen honeybee from moving between the brood chamber and a honey super. The exemplary movable top entrance further includes slots adjacent the outer frame surfaces and the baffle which provide a passageway for worker honeybees to pass between the brood chamber and the honey super.

In the exemplary embodiment, the baffle further includes a cavity adjacent an aperture through one side of the outer frame. The aperture serves as an entrance for honeybees to leave and enter the beehive. The cavity in the baffle provides Page sufficient space for worker bees to move either below the baffle and into the brood chamber or above the baffle and into a honey super. The exemplary movable top entrance further includes a landing plate extending downward from the outside frame below the aperture. The landing plate provides a base for honeybees to land and crawl along as they fly into or out of the beehive.

The exemplary beehive of the present invention further includes a base beneath the brood chamber. In one exemplary embodiment the base includes a slidable tray. In a closed position the tray is operative to seal the bottom of the beehive. By sliding the tray to an open position, dead honeybees and other debris may be cleaned out of the bottom of the beehive.

DETAILED DESCRIPTION OF THE INVENTION

Figure 1:
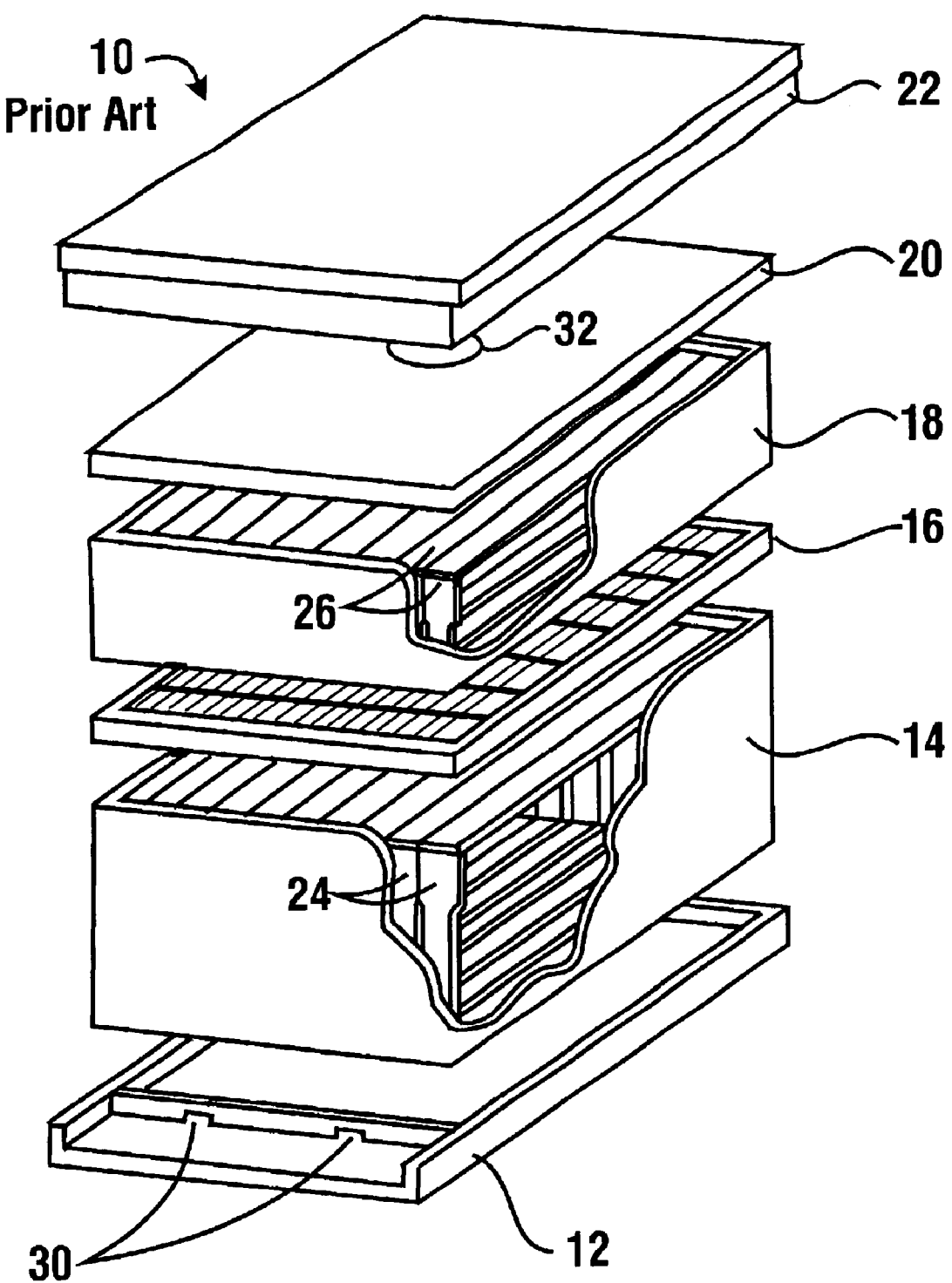
FIG. 1 is a perspective view of a prior art beehive.
Figure 2:
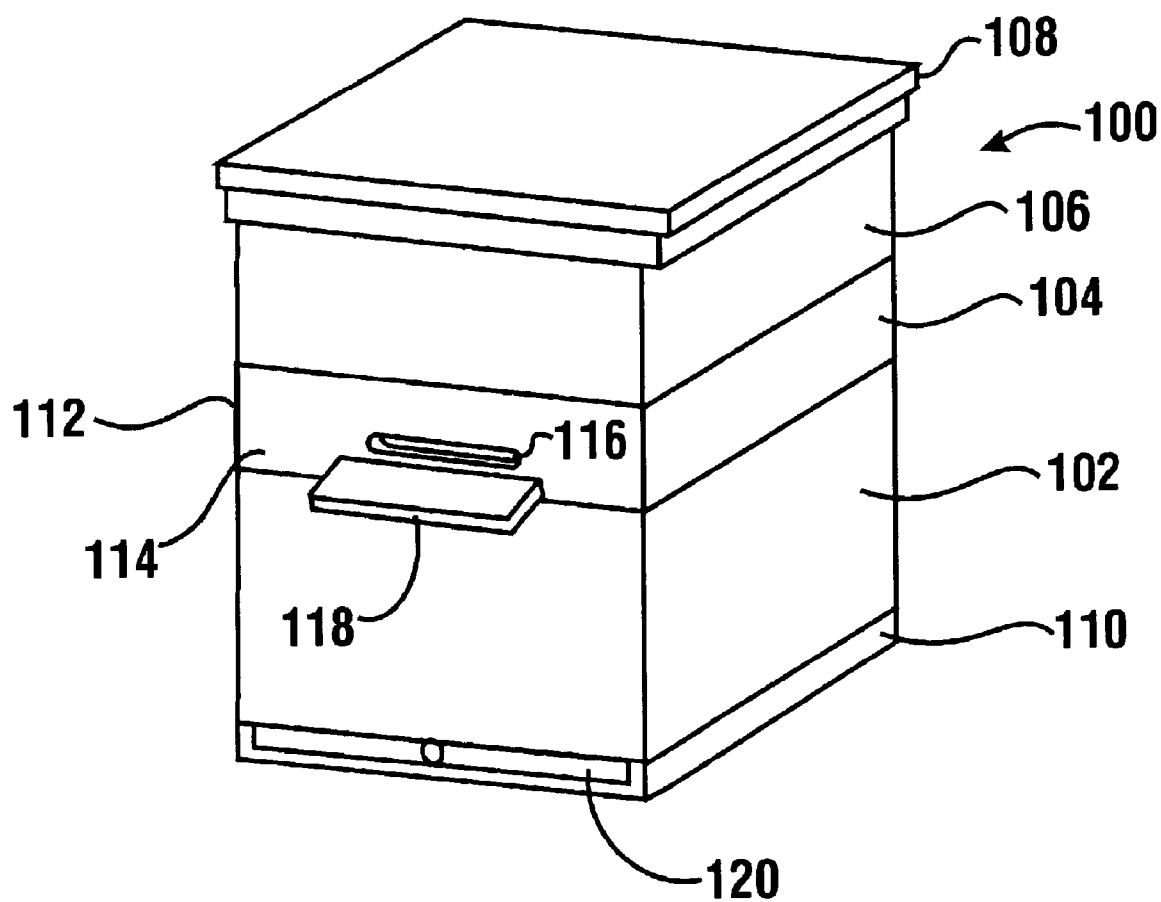
FIG. 2 is a perspective view representative of an exemplary embodiment of a beehive of the present invention.

Referring now to the drawings and particularly to FIG. 2, there is shown therein a perspective view of a beehive of one exemplary embodiment of the present invention. The exemplary beehive 100 includes a brood chamber 102, at least one movable top entrance 104, at least one honey super 106, and a cover 108. The brood chamber 102 and the honey super 106 are operative to supportingly receive a plurality of parallel honeycomb frames.

Exemplary embodiments of the present invention may further include a base 110. The exemplary base 110 is operative to support the brood chamber, however unlike prior art beehives, the base 100 does not include an entrance for honeybees and thus is operative to prevent honeybees from entering the beehive from beneath the brood chamber. In one exemplary embodiment of the present invention the base 100 may include a slidable tray 120. In the closed position the slidable tray prevents honeybees from entering the beehive from beneath the brood chamber. However by sliding the tray out, debris accumulating at the of the hive may be cleaned out.

In one exemplary configuration for the present invention, the movable top entrance 104 is adapted for placement between a brood chamber 102 and a honey super 106. For beehives that are being initially established and which do not yet have a honey super, the exemplary movable top entrance 104 may be placed between the brood chamber 102 and the top cover 108.

In alternative exemplary embodiments, the movable top entrance may be placed between two honey supers positioned above the brood chamber. Also for very large beehives with multiple honey supers, the beehive may include more than one movable top entrance with one or more honey supers sandwiched between them.

In the exemplary embodiment, the movable top entrance 104 includes either a rectangular or a square outer frame 12 with four walls. A front wall 114 of the outer frame 12 includes at least one aperture 116 with sufficient size to enable honeybees to move into and out of the movable top entrance. In one exemplary embodiment the aperture 116 has a width of about 4 and ¼ inches and a height of about 1 and ¼ inches. The exemplary movable top entrance 104 further includes a landing pad 118 below the aperture 116. In an exemplary embodiment, the landing pad 118 extends outwardly at a downward angle from the front outer wall 114. The landing pad 118 provides a crawling and/or landing place for honeybees entering or leaving the beehive. The downward angle of the landing pad 118 is operative to prevent rain water from draining into the aperture 116. In one exemplary embodiment the landing pad is angled downward from horizontal by about 20 degrees.

Figure 3:
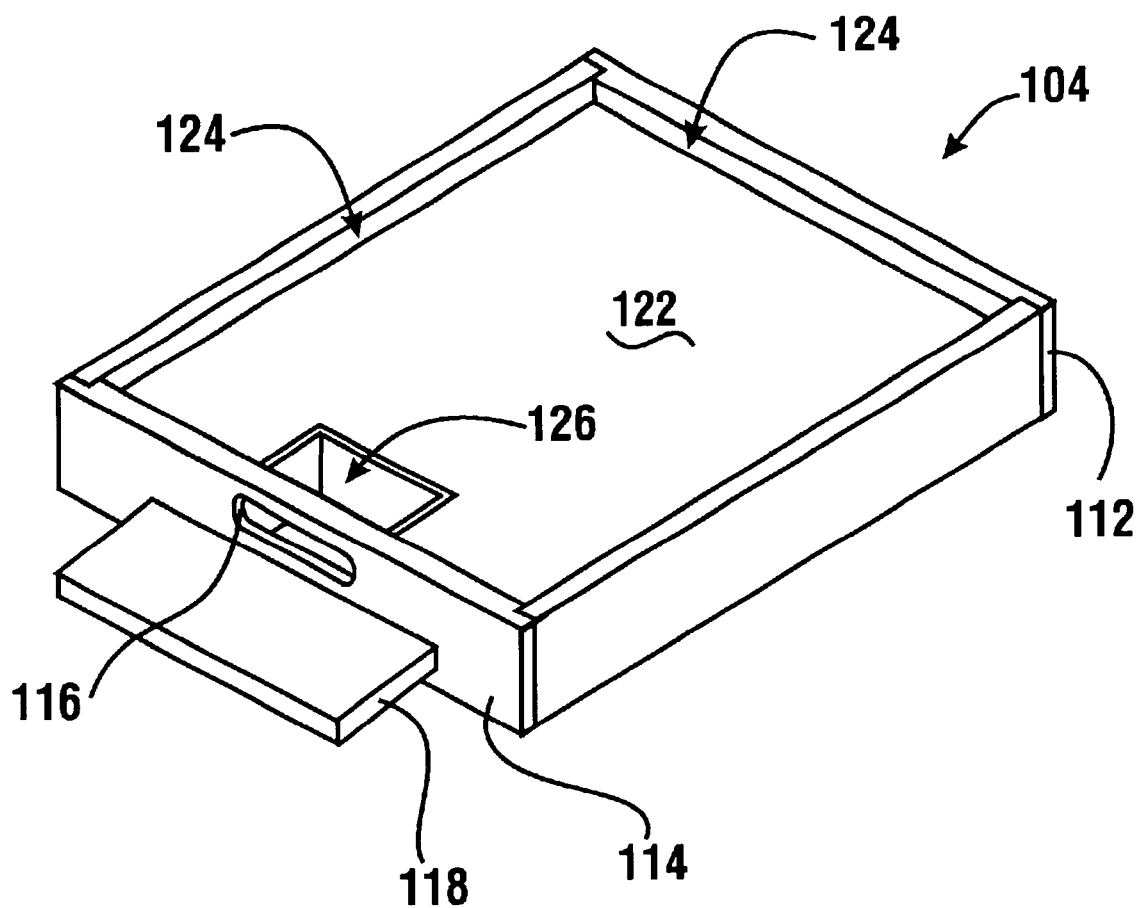
FIG. 3 is a perspective view representative of an exemplary embodiment of a beehive movable top entrance of the present invention.

FIG. 3 is a perspective view representative of the exemplary embodiment of the movable top entrance 114. Within the outer frame 112, the movable top entrance 104 includes a baffle 122. The baffle is operative to limit movement of the queen honeybee from the brood chamber to a honey super positioned above the movable top entrance. In addition, the baffle includes a cavity 126 positioned adjacent the aperture 116 in the front wall 114. The exemplary cavity 126 of the baffle 122 has a sufficient size and shape to enable honeybees to move from the aperture 116 to a location either above or below the baffle 122. In addition, the cavity 126 enables worker honeybees already within the beehive to move from one side of the baffle to the other side of the baffle. In one exemplary embodiment the cavity has a width which corresponds to the width of the aperture 116 and extends about 2 and ½ inches into the baffle.

Although it is possible that the queen honeybee may use the cavity to move to a honey super, in general the baffle has a surface area which fills the majority of the area within the outer frame. As a result, the baffle is generally operative to prevent the queen honeybee from moving upward from the brood chamber 102 to a honey super 106. In addition, the location of the cavity 126 adjacent the aperture 116 and the front wall 114 of the outer frame 112 minimizes the opportunity for the queen bee to use the cavity 126 to move to a honey super. However, when the honeybees swarm, the cavity 126 and the aperture 116 may be used by a queen bee to leave the beehive.

Figure 4:
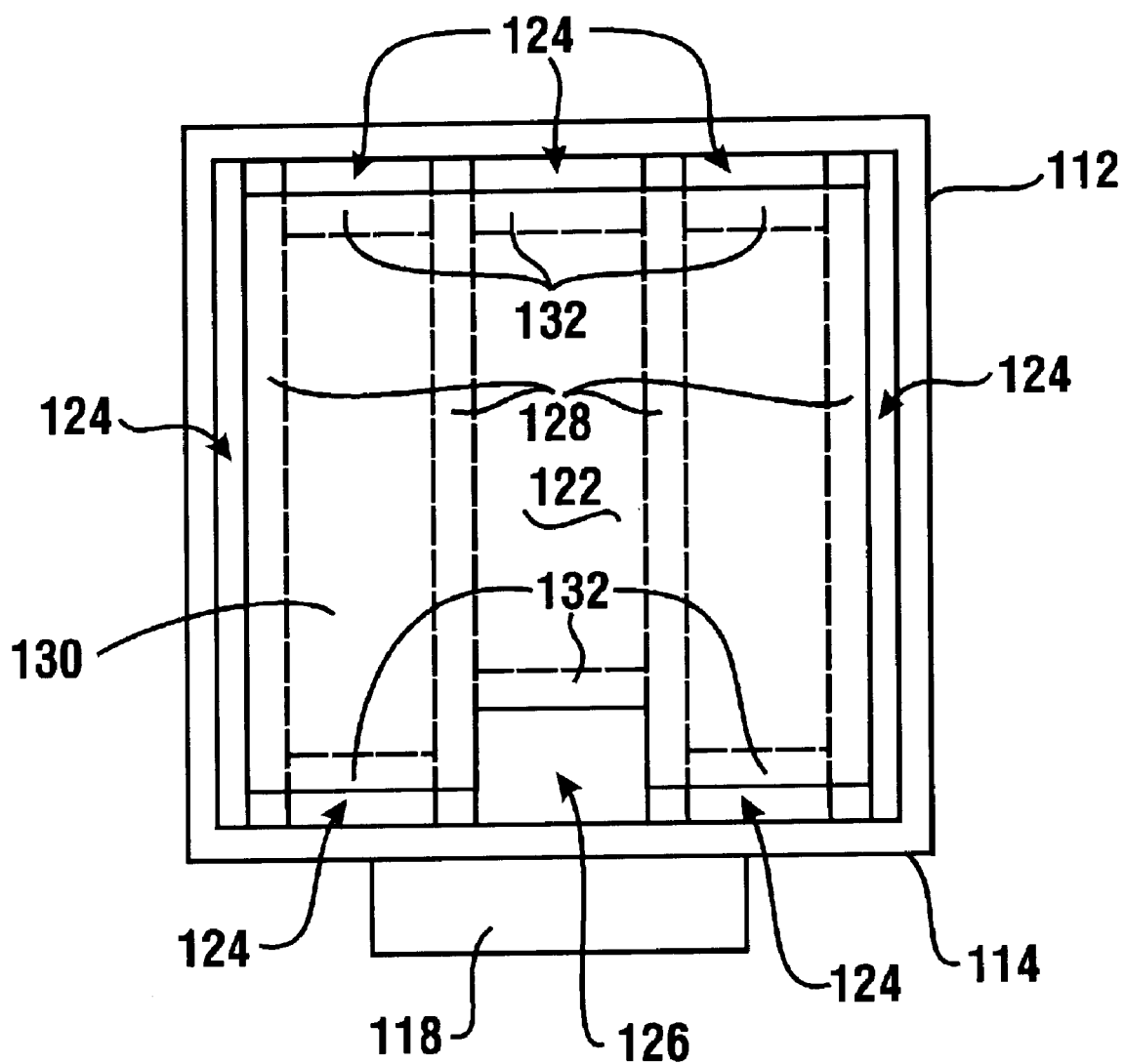
FIG. 4 is a top plan view representative of the beehive movable top entrance of the present invention.

In addition to the cavity 126, the exemplary movable top entrance further includes slots 124 between the outer frame 112 and the baffle. The slots provide additional passageways for worker honeybees to move between the brood chamber and a honey super. FIG. 4 shows a top view of the movable top entrance. In this described exemplary embodiment, slots 124 are located between each of the walls of the outer frame 112 and the baffle 122. In the exemplary embodiment, the slots are sufficiently wide to enable honeybees to pass therethrough and are sufficiently narrow to prevent comb buildup therein. In one exemplary embodiment the slots have an interior size that corresponds to a standard bee space of about ⅜ inches.

In this described exemplary embodiment, the baffle is comprised of four parallel supports 128 which are sandwiched between two generally planar boards 130. To prevent honeybees from moving into the spaces between the boards 130, the baffle includes cross members 132 between supports 128 at each end of the baffle 122. In the exemplary embodiment, the outer frame 112, the baffle 122, and the landing board are comprised of wood, however in alternative embodiments other structural materials maybe be used including plastics and metals.

In one exemplary embodiment, the outer frame has a size which corresponds to and is operative to mate with the brood chambers, honey supers, covers, and other chambers of a standard 16 and ¼ inches by 19 and ⅞ inches beehive.

However in an alternative exemplary beehive of the present invention, the movable top entrance 104, brood chamber, honey super, top cover, and bottom drawer each have a generally square shape with outer dimensions of 16 and ¼ inches by 16 and ¼ inches. Also with this alternative embodiment, the honeycomb frames for the brood chamber and the honey supers have reduced lengths which are operative to fit within the 16 and ¼ inches by 16 and ¼ inches brood chamber and honey supers.

Figure 5:
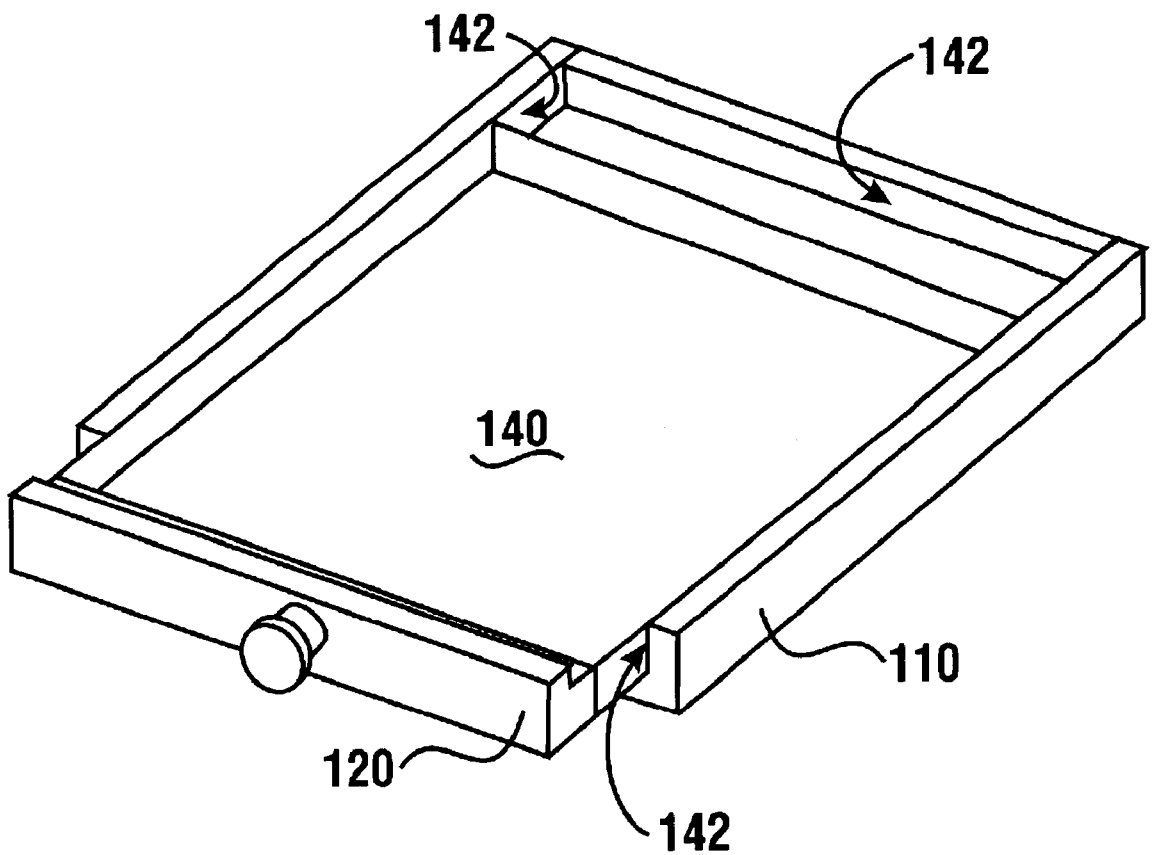
FIG. 5 is a perspective view representative of an exemplary embodiment of a beehive base with a slidable tray of the present invention.

FIG. 5 shows a perspective view representative of the tray 120 in sliding engagement with the base 110. As discussed previously, exemplary embodiments of the base 110 may include a slidable tray 120 to enable a honeybee keeper to more easily remove dead honeybees and other debris which collect in the bottom of the beehive. In the exemplary embodiment, the tray 120 includes an interior portion 140 comprised of a sheet metal such as tin or another corrosion resistant metal. The exemplary base portion 110 is comprised of wood. However it is to be understood that alternative embodiments of the tray 120 and base 110 may be comprised of other materials including wood, plastic, and metal. In this described exemplary embodiment of the beehive, the surfaces 142 between the sides of the tray 120 and base 110 are coated with a food grade grease which is operative to prevent worker bees from adhesively sealing the tray 120 to the base 110.

In the exemplary embodiment when the tray 120 is in a closed position, worker bees are prevented from entering the beehive from beneath the brood chamber. In one exemplary embodiment, the base 110 has a size and shape which is operative to mate with the bottom portion of a standard sized 16 and ¼ inches by 19 and ⅞ inches brood chamber. In an alternative exemplary embodiment, the base 110 may be generally square shaped for mating with an exemplary square brood chamber of the present invention. For example, in one exemplary embodiment the base 110 may have outer dimensions of 16 and ¼ inches by 16 and ¼ inches.

Thus the new beehive of the present invention achieves the above stated objectives, eliminates difficulties encountered in the use of prior devices and systems, solves problems, and attains the desirable results described herein.

In the foregoing description certain terms have been used for brevity, clarity, and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof.

Having described the features, discoveries, and principles of the invention, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. A beehive comprising:
    a cover;
    a brood chamber, wherein the brood chamber is adapted to supportingly receive a first plurality of parallel honeycomb frames; and
    at least one movable top entrance positioned between the cover and the brood chamber, wherein the at least one movable top entrance includes:
        an outer frame, wherein the outer frame includes at least one aperture therethrough; and
        a baffle in supporting connection within the outer frame, wherein the baffle includes at least one cavity adjacent the at least one aperture of the outer frame, wherein the at least one cavity and the at least one aperture have sufficient size to enable honeybees to move through the at least one aperture and the at least one cavity to a location either above or below the baffle; and
        at least one slot between the outer frame and the baffle, wherein the at least one slot has an interior size which is sufficiently large to enable honeybees to pass therethrough, wherein the interior size of the at least one slot is sufficiently small to prevent comb buildup therein.

2. The beehive according to claim 1, wherein the outer frame has a shape and a size which generally corresponds to a shape and size of the brood chamber, wherein the at least one movable top entrance is operative to releasably mount to the top of the brood chamber.

3. The beehive according to claim 2, further comprising at least one honey super positioned between the at least one movable top entrance and the cover, wherein the at least one honey super is adapted to receive a second plurality of honeycomb frames.

4. The beehive according to claim 3, wherein the at least one movable top entrance is operative to releasably support the at least one honey super.

5. The beehive according to claim 1, further comprising a base positioned beneath the brood chamber, wherein the base is operative to prevent honeybees from entering the beehive from beneath the brood chamber.

6. The beehive according to claim 5, wherein the base includes a tray in sliding engagement with the base, wherein when the tray is in a closed position with respect to the base, honeybees are prevented from entering the beehive from beneath the brood chamber.

7. The beehive according to claim 1, further comprising a landing pad in operative connection with the outer frame beneath the at least one aperture.

8. The beehive according to claim 7, wherein the landing pad extends from the outer frame at a generally downward angle from horizontal.

9. The beehive according to claim 1, wherein the at least one slot has a width which correspond to a standard bee space.

10. The beehive according to claim 1, wherein the at least one slot has a width of about ⅜ of an inch.

11. A beehive comprising:
    a cover;
    a brood chamber, wherein the brood chamber is adapted to supportingly receive a first plurality of parallel honeycomb frames; and
    at least one movable top entrance positioned between the cover and the brood chamber, wherein the at least one movable top entrance includes:
        an outer frame, wherein the outer frame includes at least one aperture therethrough; and
        a baffle in supporting connection within the outer frame, wherein the baffle includes a cavity adjacent the at least one aperture of the outer frame, wherein the cavity and the at least one aperture have sufficient size to enable honeybees to move through the at least one aperture and cavity to a location either above or below the baffle; and
        a plurality of slots between the outer frame and the baffle, wherein the slots have an interior size which is sufficiently large to enable honeybees to pass therethrough, wherein the interior size of the slots is sufficiently small to prevent comb buildup therein.

12. A movable top entrance for a beehive comprising:
    an outer frame, wherein the outer frame includes at least one wall with at least one aperture therethrough, wherein the outer frame has a size and shape which is operative to mount between a brood chamber and a honey super of a beehive; and
    a baffle in supporting connection within the outer frames, wherein the baffle includes at least one cavity adjacent the at least one aperture, wherein the at least one cavity and the at least one aperture have sufficient size to enable honeybees to move through both the at least one aperture and the at least one cavity to a location either above or below the baffle; and at least one slot between the outer frame and the baffle, wherein the at least one slot has an interior size which is sufficiently large to enable honeybees to pass therethrough, wherein the interior size of the at least one slot is sufficiently small to prevent comb build up therein.

13. The movable top entrance according to claim 12, wherein the outer dimensions of the outer frame correspond to the outer dimensions of a standard sized brood chamber and honey super.

14. The movable top entrance according to claim 13, wherein the outer frame has a rectangular shape of about 16 and 1/4 inches by about 19 and 7/8 inches.

15. The movable top entrance according to claim 12, wherein the outer frame has a generally square shape.

16. The movable top entrance according to claim 12, further comprising a landing pad in operative connection with the outer frame beneath the aperture.

17. The movable top entrance according to claim 16, wherein the landing pad extends from the outer frame at a generally downward angle from horizontal.

18. The movable top entrance according to claim 12, wherein the baffle has a surface area which fills the majority of the space between the outer frame and is operative to generally prevent the queen honeybee from moving upward from the brood chamber to the honey super.

19. The beehive according to claim 12, wherein the at least one slot has a width which correspond to a standard bee space.

20. The beehive according to claim 12, wherein the at least one slot has a width of about 3/8 of an inch.

21. A movable top entrance for a beehive comprising:

an outer frame, wherein the outer frame includes four walls, wherein at least one of the walls includes an aperture therethrough, wherein the outer frame has a size and shape which is operative to mount between a brood chamber and a honey super of a beehive; and a baffle in supporting connection within the outer frame between the four walls, wherein the baffle includes a cavity adjacent the aperture, wherein the cavity and the aperture have sufficient size to enable honeybees to move through both the aperture and the cavity to a location either above or below the baffle; and a plurality of slots between the outer frame and the baffle, wherein the slots have an interior size which is sufficiently large to enable honeybees to pass therethrough, wherein the interior size of the slots is sufficiently small to prevent comb build up therein.

* * * * *

UNITED STATES PATENT AND TRADEMARK OFFICE
CERTIFICATE OF CORRECTION

PATENT NO.    : 6,450,858 B1
DATED         : September 17, 2002
INVENTOR(S)   : Edmund P. Schmitz It is certified that error appears in the above-identified patent and that said Letters Patent is hereby corrected as shown below:

<u>Title page,</u>
Item [74], replace "Vocke", with -- Jocke --.

<u>Column 2,</u>
Line 43, delete "Page".

<u>Column 3,</u>
Line 25, replace "of the hive", with -- bottom of the hive --.
Line 42, replace "12", with -- 112 --.
Line 43, replace "12", with -- 112 --.

<u>Column 6,</u>
Line 61, replace "frames", with -- frame --.

Signed and Sealed this

Thirty-first Day of December, 2002

JAMES E. ROGAN
*Director of the United States Patent and Trademark Office*